Jan. 24, 1928.
D'ORSAY McC. WHITE
1,657,054
DRIVE WHEEL AND HUB
Filed Sept. 21, 1925
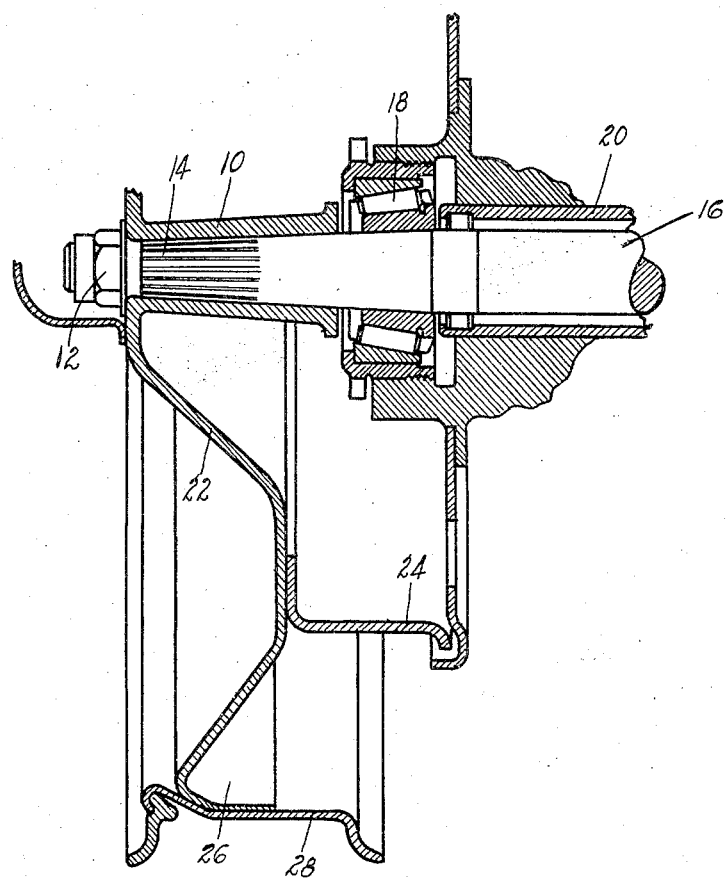
INVENTOR
D'ORSAY M<sup>c</sup>CALL WHITE
BY
ATTORNEY Patented Jan. 24, 1928.

1,657,054

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

DRIVE WHEEL AND HUB.

Application filed September 21, 1925. Serial No. 57,603.

This invention relates to wheels, and is illustrated as embodied in the rear driving wheel of an automobile. Various features of the invention relate to providing a hub in one piece with the wheel disk, and preferably internally splined and tapered, and to arranging the various parts in such a manner as to secure maximum strength.

These various features of the invention will be apparent from the following description of one illustrative embodiment shown in the accompanying drawing, in which:

The figure is a radial section through one-half of the wheel and associated parts.

The wheel illustrated is pressed in one piece from a blank suitably rolled to make it thicker in the center, so that the inwardly-extending integrally-drawn hub 10 is relatively heavy. This hub is tapered and broached to form splines, and is held by a nut 12 wedged on the splined tapered end 14 of a semi-floating live axle section 16. Section 16 is supported by an anti-friction bearing 18 at the end of the axle housing 20.

The wheel body disk 22 flares inwardly, from the outer end of hub 10, substantially to the midplane of the wheel, where a brake drum 24 is welded or otherwise secured. Thence disk 22, which tapers outwardly in thickness, flares outwardly again and is then turned inwardly to form a flange 26 terminating substantially at the midplane of the wheel. On flange 26 is wedged, by any suitable means, a tire-carrying rim 28 substantially bisected by the midplane of the wheel.

While one illustrative embodiment has been described in detail, it is not my intention to limit the scope of the invention to that particular embodiment, or otherwise than by the terms of the appended claims.

I claim:

1. A wheel having a hub, a load-carrying disk extending from the outer end of the hub, flared axially inward toward the inner end of the hub, then provided with an annular plane portion, and then flared axially outward to its periphery, in combination with a brake drum secured to said annular plane portion.

2. A wheel having a hub, a load-carrying disk extending from the outer end of the hub, flared axially inward toward the inner end of the hub, and flared axially outward again to its periphery, in combination with a brake drum secured to the disk between the two flared portions.

3. A wheel having a hub and disk drawn in one integral piece, with the disk extending from the outer end of the hub, flaring inwardly at first toward the inner end of the hub, and outwardly again to its periphery, in combination with a brake drum secured to said disk between the two flared portions.

4. A wheel having a hub and disk drawn in one integral piece, with the disk extending from the outer end of the hub, flaring inwardly at first toward the inner end of the hub, then formed with an annular plane portion, and then outwardly again to its periphery, in combination with a brake drum secured to said plane portion.

In testimony whereof, I have hereunto signed my name.

D'ORSAY McCALL WHITE.